Dec. 1, 1936. B. DICK 2,062,449
FITTING FOR HYDRAULIC BRAKE SYSTEMS
Filed May 24, 1935
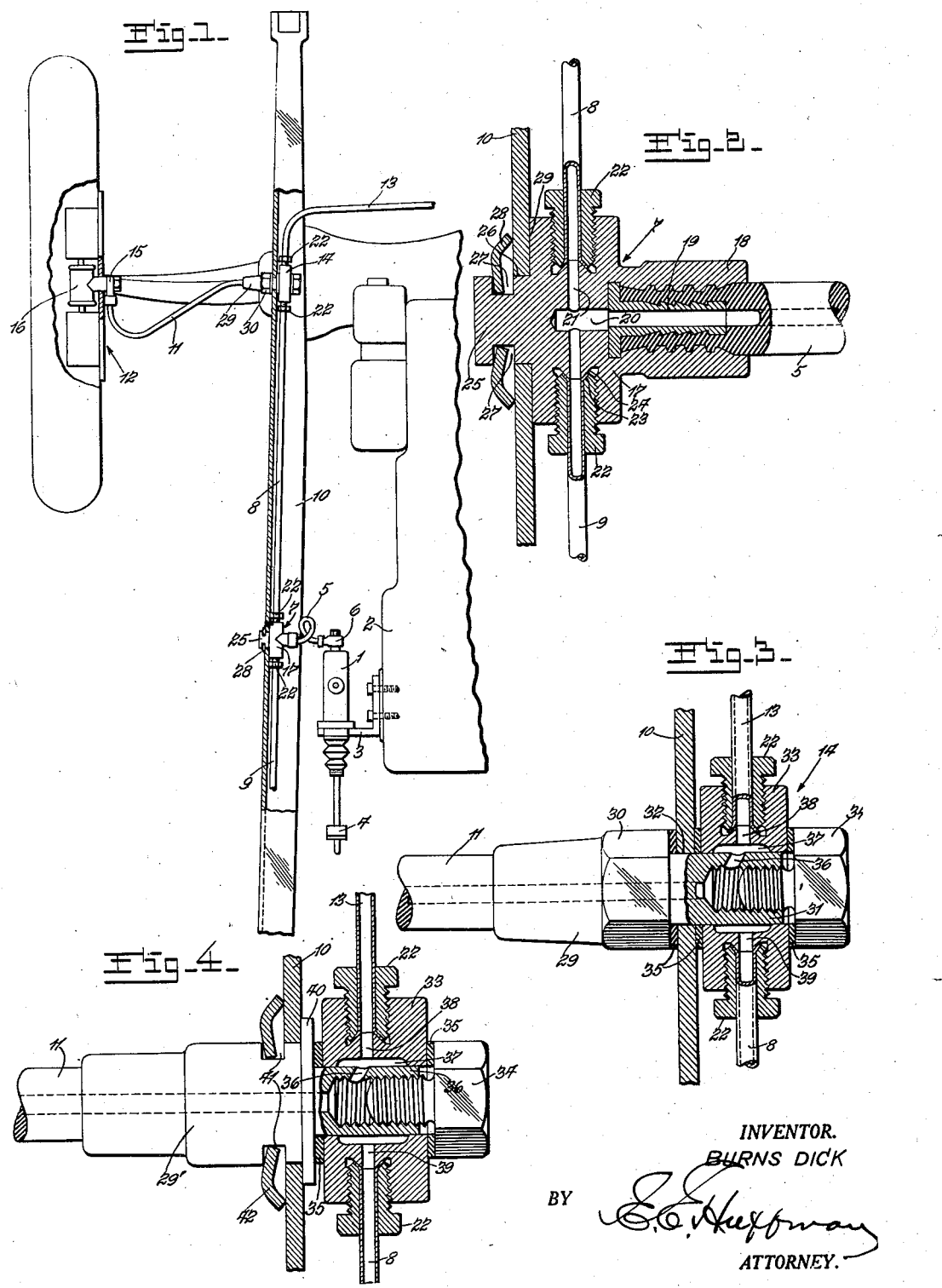
INVENTOR.
BURNS DICK
BY
ATTORNEY.

Patented Dec. 1, 1936

2,062,449

UNITED STATES PATENT OFFICE 2,062,449

FITTING FOR HYDRAULIC BRAKE SYSTEMS

Burns Dick, Ferguson, Mo., assignor to Wagner Electric Corporation, St. Louis, Mo., a corporation of Delaware Application May 24, 1935, Serial No. 23,188

10 Claims. (Cl. 285—209)

My invention relates to fittings for the lines of a hydraulic brake system of a motor vehicle, a general object being to improve and simplify the fluid conducting lines between the master cylinder and the brake actuating motors.

A more specific object of my invention is to provide an improved fitting means for connecting a flexible tube to a metallic tube and which is adapted to be easily and efficiently attached to the vehicle frame.

Other objects of my invention will become apparent from the following description taken in connection with the accompanying drawing in which Figure 1 is a view of a portion of a vehicle frame and a hydraulic braking system showing my invention incorporated therein; Figures 2 and 3 are cross-sectional views of the frame fitting members shown in Figure 1; and Figure 4 is a cross-sectional view of a frame fitting showing a modification.

Referring to the drawing in detail, in Figure 1, I have shown a portion of the front end of a vehicle and a portion of the hydraulic braking mechanism associated therewith. The hydraulic braking system includes a master cylinder device 1 mounted on the engine 2 by means of a suitable bracket 3, and a brake pedal 4 for actuating the master cylinder device through a connecting rod. The engine is generally so mounted in the chassis of the vehicle that it has relative movement with respect to the chassis and since it is desirable to employ copper tubes for conveying liquid to the wheel brakes (generally four) of the vehicle and to mount these tubes on the frame members of the chassis, it is necessary to have the master cylinder device connected to the copper tubes by means of a flexible hose. It is also necessary to employ a flexible hose between the copper tubing and the brake actuating motors since the wheels upon which the brakes are mounted are movable relative to the chassis during steering.

In accordance with my invention the flexible hose 5 which is connected at one end by terminal member 6 to the master cylinder has its other end provided with my special connecting device 7 for placing the hose in communication with the copper tube 8 leading to the front wheel brakes and the copper tube 9 leading to the rear wheel brakes. The connecting device is so constructed as to be readily secured to the side frame 10 of the chassis. Figure 2 shows this connecting device which will later be specifically described.

The copper tube 8 at the forward end of the chassis frame must be connected to the flexible hose 11 leading to the left front wheel brake 12 and also to the copper tube 13 which supplies fluid to the right front wheel brake (not shown). To facilitate this connection and to also mount the copper tubes 8 and 13 and the flexible hose 11 to the frame 10, I have shown a modified connecting device 14 similar to the connecting device 7 and more particularly shown in Figure 3. The flexible hose 11 has formed thereon a terminal 15 for connecting the hose to the fluid motor 16 whereby the brake shoes are actuated in a well-known manner.

The connecting device 7 for connecting the hose 5 to tubes 8 and 9, comprises a hose terminal member 17 having a tubular extension 18 for receiving the end of the hose 5. A suitable nipple 19 extends into the bore of the hose and the hose is permanently secured to the terminal member 17 by clamping the hose material between the nipple and the tubular extension 18. This clamping operation is preferably produced by a radial contraction of the tubular extension.

The terminal member 17 has a passage 20 for placing the bore of the hose 5 in communication with a cross-passage 21 which in turn is in communication with the tubes 8 and 9. Each tube is connected to the terminal member 17 by standard connecting means comprising a tubular nut 22 for sealing the flared end 23 of the tube against the conical seat 24.

In order to secure the connecting device 7 to the frame member 10, the terminal member 17 is provided with an extending portion 25 adapted to be received in an opening 26 in the frame member. This extending portion is formed with a pair of cross-cuts 27 for receiving a U-shaped spring clip 28 which clip, when in its operative position, clamps the frame member 10 against the shoulder 29 on the terminal member. Other means may be employed such, for example, as a nut for performing this clamping operation, but I prefer to use the spring clip means shown since it facilitates assembly and disassembly.

The connecting device 14 employed in connecting the tube 8 to tube 13 and to the hose 11 comprises a terminal member 29 permanently secured to the end of the hose in a manner similar to that by which hose 5 is secured to the terminal member 17. This terminal member has formed thereon a wrench-receiving portion 30 and a tubular extension 31 which is adapted to extend through an opening 32 in the frame member 10. A member 33 surrounds the extension 31 and is adapted to be clamped to the frame 10 by means of a bolt 34 which cooperates with threads on the inner surface of the tubular extension 31. The bolt 34, when screwed up, also clamps the shoulder formed by the wrench-receiving portion 30 against the frame 10. In order to make the device fluid-tight, suitable gaskets 35 are employed between the wrench-receiving portion and the frame; between the frame and the member 33; and between the member 33 and the head of the bolt 34.

To provide communication between the tubular extension 31 and the tubes 8 and 13, the tubular extension has a passage 36 which communicates with an annular chamber 37 formed in the member 33. A passage 38 places the tube 13 in communication with the chamber, and passage 39 places tube 8 in communication with chamber 37. The tubes 8 and 13 are connected to the member 33 by means of the standard construction employed in connecting the tubes 8 and 9 to the terminal member 17.

If desired, the connecting devices 7 and 14 may be interchanged with very little modification. For example, if it is desired to use the connecting device 14 in place of connecting device 7, it will only be necessary to interchange the relative positions of the member 33 and the frame, thus placing the two copper tubes leading therefrom on the desired side of the frame.

In Figure 4 I have shown a slight modification of the connecting device 14, in which one of the sealed surfaces is eliminated. In this modified device the wrench-receiving portion is replaced by an annular shoulder 40 against which is clamped the member 33 by means of bolt 34. The terminal member 29' is formed with a pair of cross-cuts 41 for receiving a U-shaped spring clip 42 whereby the annular shoulder 40 is clamped against the frame member 10. The remaining construction is the same as that shown in Figure 3, there being a gasket 35 between the shoulder 40 and the member 33 and between the member 33 and the head of the bolt 34.

Although I have shown several connecting devices in a single brake system for connecting a flexible hose to two metallic tubes, which devices are provided with means for clamping them to a frame member, it is to be understood that such is for the purposes of illustration only and that if desired, any one of the devices may be employed at any place in the system where such a connecting device is required and that the member to which the device is clamped may be some type of support other than a frame member.

Having fully described my invention, what I claim as new and desire to secure by Letters Patent of the United States is:

1. In a hydraulic braking system for motor vehicles, the combination with a supporting member provided with an opening, a flexible hose, a terminal member provided with a sleeve permanently clamped to the hose end and also having an integral portion extending through the supporting member opening, two metallic tubes positioned at substantially right angles to the extending portion, means for connecting said tubes to the terminal member, said tubes being in communication with the hose bore by means of passages in the terminal member and means for detachably securing the terminal member to the supporting member.

2. In a hydraulic braking system for motor vehicles, the combination with a supporting member provided with an opening, a flexible hose, a terminal member provided with an integral sleeve permanently clamped to the hose end and also having an integral portion extending through the supporting member opening, two metallic tubes positioned on the same side of the supporting member as the hose and at substantially right angles to the hose bore, means for connecting said tubes to the terminal member, said tubes being in communication with the hose bore by means of passages in the terminal member, and means for detachably securing the terminal member to the supporting member.

3. In a hydraulic braking system for motor vehicles, the combination of a supporting member provided with an opening, a flexible hose, a terminal member provided with an integral sleeve permanently clamped to the hose end and also provided with an integral portion extending through the supporting member opening, said terminal member having a passage communicating with the hose bore, a metallic tube positioned at substantially a right angle to the axis of the hose, means carried by the terminal member for placing said tube in communication with the passage in the terminal member, said last named means and the tube being positioned on one side of the supporting member, and means on the opposite side of the supporting member and cooperating with the integral portion of the terminal member for clamping the terminal member and the means carried thereby to the supporting member.

4. In a hydraulic braking system, the combination of a supporting member having an opening therethrough, a flexible hose, a terminal member provided with a sleeve permanently clamped to one end of the hose and also provided with a shoulder and an integral portion extending through the supporting member opening, means cooperating with the extended integral portion for clamping the shoulder of the terminal member to the supporting member, two metallic tubes, and means for securing said tubes to the terminal member, said terminal member being provided with passages for placing the hose in communication with each tube.

5. In a hydraulic braking system, the combination of a supporting member provided with an opening, a member provided with an integral opening, a member provided with an integral part extending through said opening and with a passage, a conduit secured to said member and having its bore in communication with the passage, a second member surrounding the first named member, a second conduit secured to said second member, means providing comunication between said second conduit and the passage in the first named member, and means for clamping the two members together and to the supporting member.

6. In a hydraulic braking system, the combination of a supporting member provided with an opening, a member provided with an integral opening, a member provided with an integral part extending through said opening and with a passage, a conduit secured to said member and having its bore in communication with the passage, a second member surrounding the first named member, a second conduit secured to said second member, means providing communication between said second conduit and the passage in the first named member, and means cooperating with the part of said member which extends through the opening for clamping the second named member to the first named member and both members to the supporting member.

7. In a hydraulic braking system, the combination of a supporting member having an opening therethrough, a flexible hose, a terminal member having a tubular extension receiving the hose end and permanently clamping said end and terminal member together, said terminal member also being provided with a shoulder and an integral portion extending through the supporting member opening, means cooperating with the extending portion for clamping the shoulder to the supporting member, two metallic tubes situated on the same side of the supporting member as the hose, and means for securing the tubes to the terminal member, said terminal member being provided with interconnecting passages for placing the hose in communication with the tubes.

8. In a hydraulic braking system, the combination of a supporting member having an opening therethrough, a flexible hose, a terminal member provided with an integral sleeve permanently clamped to one end of the hose and also provided with an integral portion extending through the supporting member opening, said terminal member and extending portion having a passage in communication with the hose, a metallic tube positioned at substantially a right angle to the axis of the extending portion, means surrounding the extending portion of the terminal member and to which the tube is secured for placing said tube in communication with the passage in the extending portion, and means cooperating with the extending portion for securing the terminal member to the supporting member.

9. In a hydraulic braking system, the combination of a supporting member having an opening therethrough, a flexible hose, a terminal member permanently secured to one end of the hose and provided with a shoulder and an integral portion extending through the supporting member opening, said terminal member and extending portion being provided with a passage in communication with the hose, a member surrounding said extending portion, a tube secured to the member, said member being provided with a passage placing the first named passage in communication with the tube, and means cooperating with the extending portion of the terminal member by which the surrounding member and the supporting member are both clamped between the shoulder of the terminal member and said means.

10. In a hydraulic braking system, the combination of a supporting member having an opening therethrough, a flexible hose, a terminal member permanently secured to one end of the hose and provided with a shoulder and an integral portion extending through the supporting member opening, said terminal member and extending portion being provided with a passage in communication with the hose, a member surrounding said extending portion, a tube secured to the member, said member being provided with a passage placing the first named passage in communication with the tube, means for clamping the member to the shoulder, and means cooperating with the terminal member for securing it to the supporting means.

BURNS DICK.